(12) United States Patent
Cox et al.

(10) Patent No.: US 8,184,092 B2
(45) Date of Patent: May 22, 2012

(54) SIMULATION OF WRITING ON GAME CONSOLES THROUGH THE USE OF MOTION-SENSING TECHNOLOGY

(75) Inventors: Jason Alan Cox, Raleigh, NC (US); Lydia Mai Do, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 12/125,428

(22) Filed: May 22, 2008

(65) Prior Publication Data
US 2009/0289892 A1 Nov. 26, 2009

(51) Int. Cl.
*G09G 5/00* (2006.01)

(52) U.S. Cl. ........ 345/156; 345/165; 345/179; 345/175; 345/173; 345/174; 345/176; 345/177; 345/178; 715/863; 715/864; 715/865; 715/866; 382/103; 463/37

(58) Field of Classification Search .......... 715/863–866; 345/156, 165, 175, 186; 382/103; 463/37
See application file for complete search history.

(56) References Cited

U.S. PATENT DOCUMENTS

| | | | |
|---|---|---|---|
| 6,729,547 B1 | 5/2004 | Charlier et al. | |
| 6,882,975 B2 | 4/2005 | Yotoriyama et al. | |
| 7,421,647 B2 | 9/2008 | Reiner | |
| 7,667,686 B2 | 2/2010 | Suh | |
| 7,765,245 B2 | 7/2010 | Nichols et al. | |
| 2003/0228909 A1 | 12/2003 | Tanaka et al. | |
| 2006/0003824 A1 | 1/2006 | Kobayashi et al. | |
| 2006/0007188 A1* | 1/2006 | Reiner | 345/179 |
| 2006/0211495 A1 | 9/2006 | Lin | |
| 2007/0233740 A1* | 10/2007 | Nichols et al. | 707/104.1 |
| 2007/0294297 A1* | 12/2007 | Kesteloot et al. | 707/104.1 |
| 2008/0174550 A1 | 7/2008 | Laurila et al. | |
| 2009/0048020 A1 | 2/2009 | Gruen et al. | |
| 2009/0191968 A1 | 7/2009 | Johnson et al. | |
| 2009/0289892 A1 | 11/2009 | Cox et al. | |
| 2009/0291759 A1 | 11/2009 | Cox et al. | |

FOREIGN PATENT DOCUMENTS

JP 2005685526 A 9/2005

OTHER PUBLICATIONS

Graffiti Anywhere, The Graffiti Anywhere Page, www.escande.org/palm/GrfAnywhere, 5 pages, Jan. 15, 2007.
Jeff Van West, Write Anywhere, Microsoft Windowx XP, Jul. 15, 2003, 3 pages, www.microsoft.com/windowsxp/using/tabletpc/learnmore/vanwest_03july15wa..mspx.
From Wikipedia, the free encyclopedia, Wired Glove, http://en.wikipedia.org/wiki/Wired_glove, 2 pages. Nov. 7, 2007.
Office Action issued on Aug. 10, 2011 for U.S. Appl. No. 12/125,295.

* cited by examiner

*Primary Examiner* — Richard Hjerpe
*Assistant Examiner* — Jeffrey Steinberg
(74) *Attorney, Agent, or Firm* — Yee & Associates, P.C.; Jennifer Davis

(57) ABSTRACT

A method and system of utilizing a game console with motion sensing technology is provided. The present invention, in various implementations, provides for a method for generating one or more symbols in response to one or more gestures using an input device of a gaming system. The method comprises providing the input device being capable of generating one or more gesture signals in response to one or more gestures and being operable to select a mode of one or more operational states. The method also provides for generating one or more gesture signals corresponding to the one or more gestures, respectively; mapping the one or more generated gesture signals in relation to one or more symbols, respectively; and, transmitting the one or more symbols corresponding to the respective one or more gesture signals to an output.

19 Claims, 5 Drawing Sheets

SIMULATION OF WRITING ON GAME CONSOLES THROUGH THE USE OF MOTION-SENSING TECHNOLOGY

CROSS-REFERENCE TO RELATED APPLICATIONS

This application is related to co-pending patent application filed concurrently on even-date herewith entitled, "SIMULATION OF WRITING ON GAME CONSOLES THROUGH THE USE OF MOTION-SENSING TECHNOLOGY", all of which is incorporated herein by reference.

FIELD OF THE INVENTION

The present invention relates generally to a gaming console and more particularly for simulating writing using such a console.

BACKGROUND OF THE INVENTION

Gaming systems have become increasingly popular over time. As gaming systems have increased in performance, their capability has also expanded into a role as an information portal for users to obtain web access exchange information between gamers, and even provide communication between networked parties. As a result, users are beginning to demand more than just gaming capability from their gaming systems, and additionally seek broader interoperability and capability for information exchange.

Providers have attempted to produce peripheral devices which are interoperable with certain gaming systems and their networked counterparts to assist in information exchange. These devices typically provide for messaging, verbal or imagery-based exchanges across such systems. For instance, Microsoft has introduced a capability for chatting technology in certain of its systems, such as with its Microsoft® XBOX® 360's chatpad hardware and Xbox® Live interface. The Microsoft chatpad, by example, provides a user the ability to type messages using traditional text without disruption to the gaming experience such that a user may continue to play the present active game. In essence, the chatpad and similar devices provide a current implementation of a combination of earlier tools required by a user, where previously, the user used a keyboard device or a controller to scroll through and select letters apart from the gaming device, and was typically required to disrupt the active game activity. However these types of peripheral devices often are offered as options in addition to the basic gaming system components. These same peripherals then also often require additional connectivity and also bring forth additional expense for a user. Further these types of peripheral devices do not provide a transparent interface for a user using a gaming system having multiple environments therein.

Alternative attempts have also been sought to make use of audio input that is processed in parallel with gameplay for communication, for instance with other players. While audio input, such as voice over IP (VOIP) or speech-to-text translation, accomplishes the parallelism needed to further gameplay, this approach Occurs at the expense of the user in terms of additional cost, area, and power. Further and disadvantageously, the user is typically required to cover the upfront purchase price of peripherals such as headphones, microphones, speakers, etc. and is further expected to manage residual energy usage, containment, and upkeep of the devices. The number of accessories and options for electronic products has continued to increase over the years, thus the addition of more peripherals is typically a hardware approach that ultimately results in higher costs and more complex management issues for the user.

Therefore, while some conveniences to reducing the disruption in the gaming experience to game players have been realized in these approaches, these efforts have come at a cost to users and have not resulted in flexible modes of communication being available through gaming systems. More particularly, the gaming experience remains devoid of the ability to use the gaming peripherals intended for gaming in a manner to attend to the non-gaming communications such as that of writing. Additionally, the transparency in operation is lacking in these efforts as these additional features are often of little benefit in the gaming operation during a gaming experience.

For instance, while the chatpad offers a convenience to users, the use of the text pad is still a distraction from the gaming activity. The chatpad is merely a traditional text entry device more conveniently situated within a single gaming tool, and does not provide a seamless interface from the user to the non-gaming communications activity. Further the chatpad is an additional peripheral not essential to the gaming system but which is operative to be only a convenience to a user of the gaming system for non-gaming needs. The chatpad is a peripheral supplement to the gaming system and provides a text capability which is typically not required for many gaming systems. The act of texting then remains founded in traditional input devices in varying forms, with few if any advances made in the art to offer improved convenience to gamers for providing a writing capability within a gaming system. Unfortunately, an additional peripheral beyond the normal gaming system components is then required for the added convenience to perform activities not typically associated with gaming and the additional peripheral does not necessarily enhance the gaming experience.

Therefore, it is desirable to have a gaming system which provides for a writing capability without the need for additional peripherals in a gaming system. It is further desirable to have a method and system for providing for a writing capability to a game center in a gaming system using components of the gaming system which further provides a user of the gaming system a convenient and efficient ability to write therein. The present invention addresses such needs.

SUMMARY OF THE INVENTION

A method and system of utilizing a game console with motion sensing technology is provided. The present invention in various implementations, provides for a method for generating one or more symbols in response to one or more gestures using an input device of a gaming system. The method comprises providing the input device being capable of generating one or more gesture signals in response to one or more gestures and being operable to select a mode of one or more operational states. The method also provides for generating one or more gesture signals corresponding to the one or more gestures, respectively; mapping the one or more generated gesture signals in relation to one or more symbols, respectively; and, transmitting the one or more symbols corresponding to the respective one or more gesture signals to an output.

In a further implementation the present invention provides for a computer program product for generating one or more symbols in response to one or more gestures using an input device of a gaming system, in which the processing system comprising a computer, a storage medium, and a processor, an input device being capable of generating one or more gesture signals in response to one or more gestures, capable of transmitting one or more gesture signals, and being operable to select a mode of one or more operational states, and a console being capable of receiving one or more transmitted gesture signals and generating one or more symbols. The product also provides for a computer readable medium having program instructions for which provide for generating one or more gesture signals corresponding to the one or more gestures, respectively; mapping the one or more generated gesture signals in relation to one or more symbols, respectively; and transmitting the one or more symbols corresponding to the respective one or more gesture signals to an output.

In still a further implementation of the present invention, a gaming system comprising: a processor; a storage medium; one or more input devices being capable of generating one or more gesture signals in response to one or more gestures, capable of transmitting one or more gesture signals, and being operable to select a mode of one or more operational states; a console being capable of receiving one or more transmitted gesture signals and generating one or more symbols; and a computer readable memory coupled to the processor and containing program instructions is provided for. The instruction, when executed, implements a method in an operating state selected by the input device of the gaming system and provides for: generating one or more gesture signals corresponding to the one or more gestures, respectively; mapping the one or more generated gesture signals in relation to one or more symbols, respectively; and transmitting the one or more symbols corresponding to the respective one or more gesture signals to an output.

BRIEF DESCRIPTION OF DRAWINGS

The present invention will become more fully understood from the detailed description given hereinafter and the accompanying drawing(s) given by way of illustration only, and thus are not intended as a definition of the limits or limitations of the present invention, and wherein.

DETAILED DESCRIPTION OF PREFERRED EMBODIMENTS

Figure 1A:
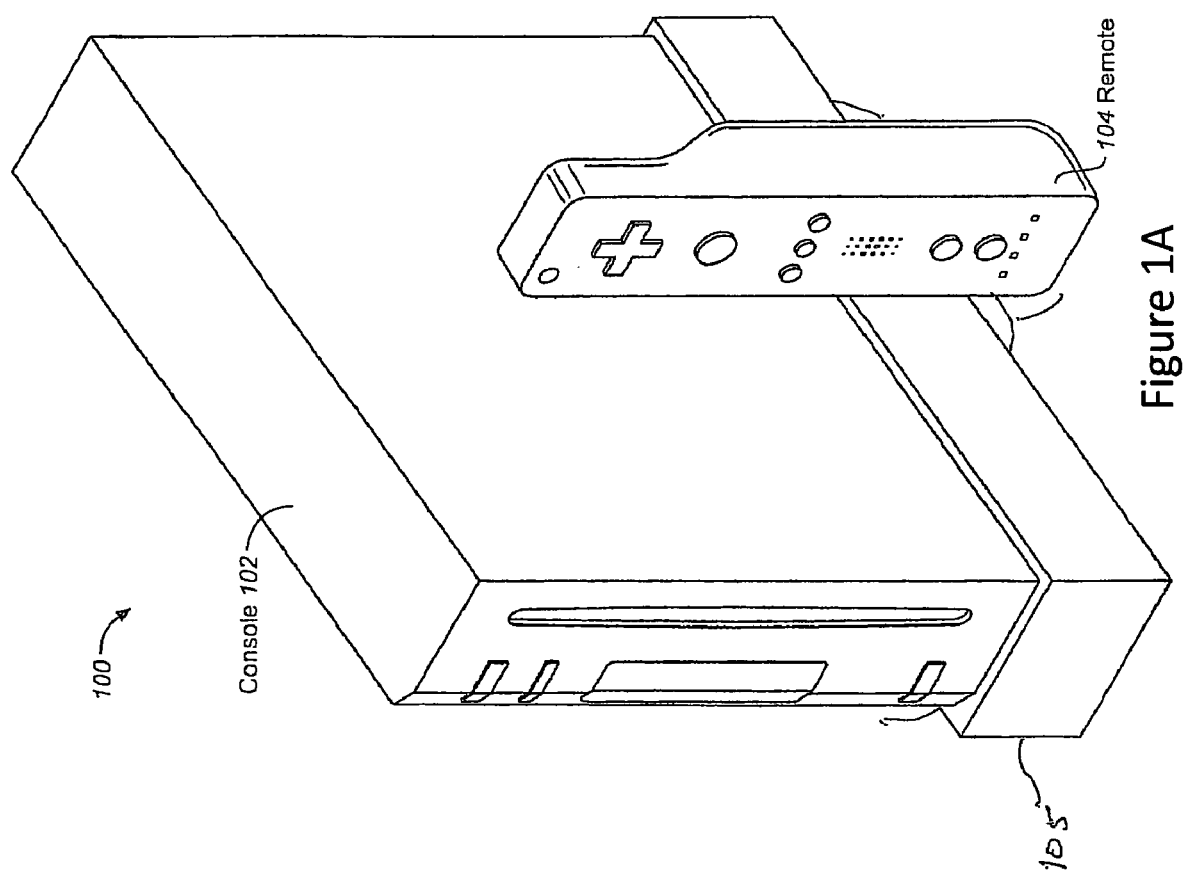
FIG. 1A is an illustration of a Nintendo® game console and a remote, hereinafter referred to as the Wii® system.

The present invention relates generally to gaming consoles and more particularly to providing for a simulated writing capability using such a console inclusive of its system components. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Recent approaches to various gaming systems include input devices which are utilized in accordance with the present invention, in various implementations, to provide for a simulated writing capability to game consoles and systems using standard components of the gaming system.

For example, developing input devices, such as eye-tracking systems, allow for motion-based directives to perform system functions. Still other input devices, such as those utilizing motion-sensing input devices, now also allow for gesture-based directives to perform system functions. It is envisioned by the present invention that a diversity of input devices are included as a part of the present invention, independent of their specific system functions, where each input device is capable of performing one or more system functions in relation to the specific input device. As used herein, the term "input device" and "electronic input device" are intended to be used interchangeably and include any input device capable of performing one or more system functions in relation to the input activity or actions of the device. The devices as used herein include an ability to relate input activity at the device with simulated activity intended by the user of the device, and may include any one or more of gaming peripherals, gaming controllers, and, without limitation, singly or in combination, any of the following types of input devices: touch-sensitive; motion-sensitive; multi-degrees-of-freedom (MDOF); inertia-sensing; depression-activated; force-input; mass-based providing kinesthetic feedback; mass-reduced providing virtual feedback; gesture-based; neural-impulse-based; muscular-activity-based; pointing-based; stylus-derived; voice-activated; light-activated; and the like.

For instance, input devices, such as those utilizing motion-sensing input devices, provide for gesture-based directives to perform system functions. These gesture-based devices may include but are not limited to motion-sensing device, motion-sensitive devices, devices having one or more accelerometers, devices capable of determining three axis location positioning, devices capable of detecting displacement between a first point and a second point, devices capable of determining force, speed acceleration and other movement traversing a path between a first point and a second point, and the like. In essence, these input devices are capable of being deemed as gesture-based devices include but are not limited to those devices which are able to detect motion displacement, detect movement, or a combination thereof. Preferably these input devices as used herein in various implementations of the present invention then are capable of providing one or more signals in relation to at least one or more of the detected motion displacement, detected movement, or combination thereof.

A system that utilizes standard components of the gaming system to provide for a simulated writing capability to game consoles in accordance with the present invention can take the form of an implementation of entirely hardware, entirely software, or may be an implementation containing both hardware-based and software-based elements. In one implementation, this disclosure is implemented in software, which includes, but is not limited to, application software, firmware, resident software, program application code, microcode, etc.

Furthermore, the simulating writing process of the present invention can take can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program or signals generated thereby for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W)

FIG. 1A is an illustration of a Nintendo® game console 102 having a base 105, and a remote 104, hereinafter referred to as the Wii® system 100. A distinguishing feature of the console 102 is its associated wireless controller (i.e., remote) 104, also known as the Wii remote, which can be used as a handheld pointing device and can detect acceleration in three dimensions (i.e., type of motion-sensing technology). The WII remote is an example of an input device of the present invention, but the present invention is not so limited thereto.

The Wii system 100 includes the console 102, a stand 105 to allow the console 102 to be placed vertically oriented in one scenario, at least one Wii remote 104, and a sensor bar (not shown) for sensing the position of the remote 104 by exchanging information signals with the remote. The Wii remote 104 is the primary controller for the console 102. The remote 104 uses a combination of built-in accelerometers and infrared detection to sense its position in 3D space when pointed at the LEDs within a sensor bar. This design allows users to control the game using physical movements and gestures (hereinafter collectively referred to as "gestures") as well as traditional input depression techniques such as button presses. The Wii wireless remote 104 connects to the console 102 using Bluetooth® and the remote also features an internal speaker. The Wii remote 104 can connect to other devices through, for example, a proprietary port at the base of the remote 104.

Although the presentation in FIG. 1A is that of a WII system 100 which includes a wireless controller 104 with motion sensing technology, the present invention is not so limited as one of ordinary skill in the art will readily recognizes that a variety of systems which include types of motion sensing technology and other input devices, for instance, as described above, could be used without limitation, and that the use of such systems is envisioned herein and would be within the spirit and scope of the present invention.

Additionally, the present invention envision improved input devices over those of the Wii and similar. For instance, while internal to a Wii remote, accelerometers in chip technology may include a wafer affixed to silicon springs within the controller such that when the Wii remote is "waved" or passed from a first point to second point in mid air, the movement and acceleration of the remote causes the wafer to press upon the springs, such that the faster the controller (i.e., remote) accelerates, the more the wafer moves relative to the rest of the chip. In the remote, the accelerometer monitors the position of the wafer by measuring capacitance, or the ability to store electric charge, in varying directions. Therefore, operationally, when a controller is moved quickly forward as in a "punch" movement, the capacitance increases at the back of the wafer and decreases at the front. The remote then is able to determine the movement, speed and direction of the remote using capacitance in relation to how the wafer moves. The capacitance information is then translated to simulate real-life movements and therefore may appear on a Wii system as though the movement was a "punch." Information obtained by the remote is usable in various implementations of the present invention irrespective of the present capabilities of information gathering and/or use by the Wii device itself.

However, most remotes also do not account for positional errors. Attempts to limit the impact of positional errors have been attempted such as in the development of the Wii sensor bar, in which each end of the Wii sensor bar emits a beam of infrared light which is monitored by a sensor on the controller to determined where the two spots of light fall on its pixel grid, such that the sensor can determine where the controller is pointing and translate it to a position on the display, accounting for some positional error correction as between the two devices. Further it is known that Wii remote does not use all data it collects or is capable of collecting, and the present invention is able to employ all such data collected by such input devices, where additional data derived or obtained from such input devices shall only further enhance the robust operation of the present invention. Therefore the present invention envisions both existing and improved input devices in its operation and the use and availability of information and data obtained from such devices and associated therewith.

Therefore, by using motion sensing technology within associated input devices such as those described previously, or such as that discussed above with the Wii remote 104 example, along with text interpretation software, a user is able to simulate writing on a display in a gaming system by gesturing and thereafter have text appear in a specific area of the display in an operational state. In one or more implementations, a user using the present invention would also identify the mode of operation (i.e., operation state) for which the user is desirous of. For instance, in normal gaming operation, a gaming system would be operational in a gaming state, or normal. In the normal or gaming state, the operation of the remote would be used where the motion and movement of the remote is for use in regular gameplay. However, where the user desires to enter an operational condition other than the normal or gaming state, such as a communication state for writing the user enters an alternate mode or state to allow the game to distinguish that the motion detected from the remote is to be used to simulate writing in the communication state for writing. In this communications mode (i.e. non-gaming mode), the game mode may be temporarily suspended, halted or placed into a background, such that the communication (i.e., that of writing) may be attended to using the remote or input device.

The present invention is able to distinguish between operational states and accordingly processes the signals detected from an input device in the appropriate manner in relation to the operational mode. It will be understood by those skilled in the art that the present invention may be in one operational state for an undetermined amount of time, is able to switch back and forth in any sequence as between operational states which may number beyond two states, that a mode of a selected operational state is not dependent necessarily on a characteristic of time, and that an operational state may have both a gaming and a non-gaming aspect to such state. For instance in a non-gaming mode, or in a mixed mode in various implementations, the mode may exist in-game or outside of game play such that a separate display, sub-display, segmented display or other method may be made visible to alert the user that a non-gaming state has been selected. In further implementations the selection of a non-gaming state may not preclude the user from switching back and forth to maintain the gaming experience presently underway. Additionally it is envisioned that there may be a plurality of sub-states within any single mode.

Figure 1B:
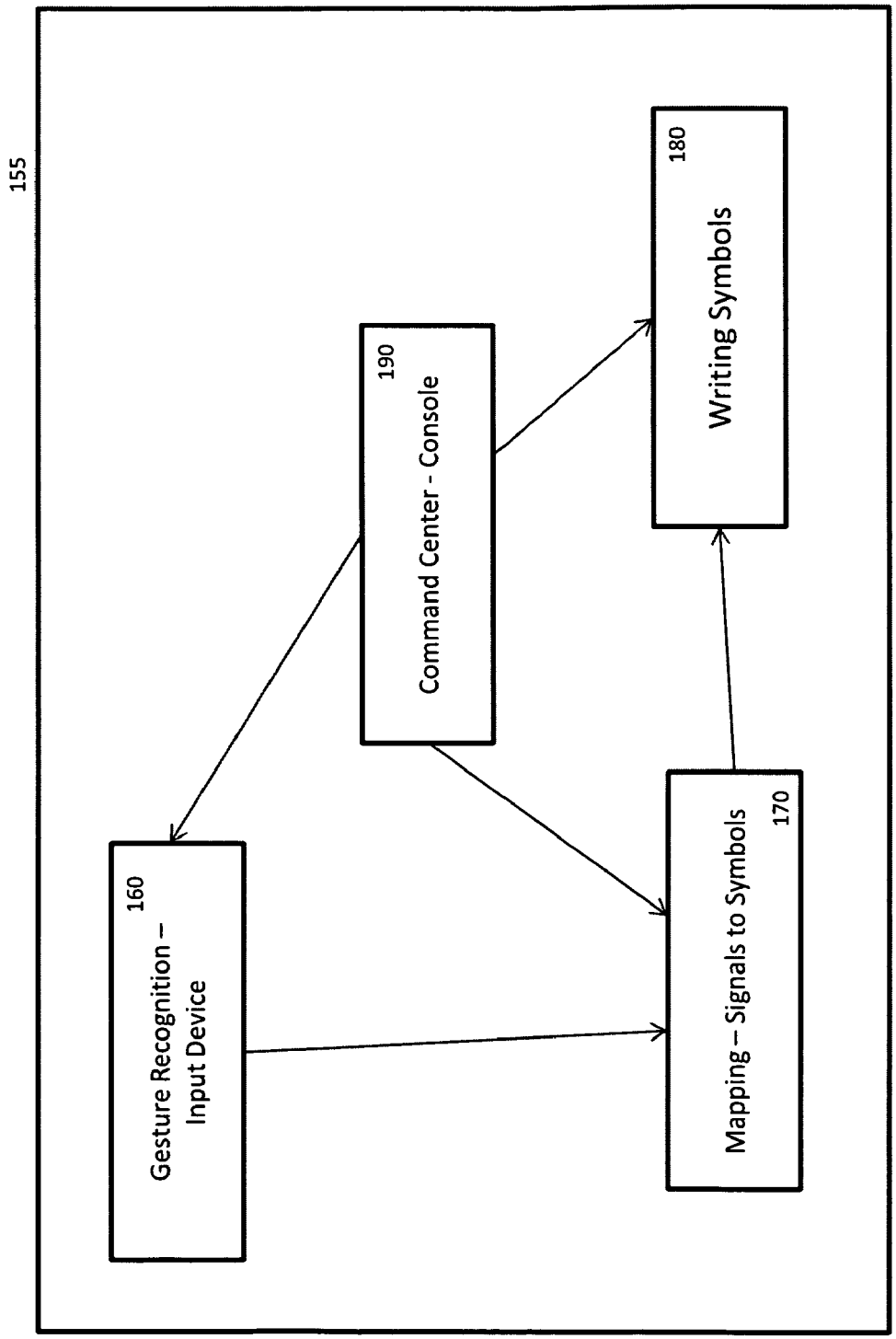
FIG. 1B is a functional block depiction of the present invention in various implementations

FIG. 1B is a functional block depiction 150 of the present invention in various implementations. The block depiction 150 demonstrates the relationship between key functions of the present invention and their inter-relations within the system, 155. For instance, gesture recognition 160 is determined using input devices of the present invention and gesture signals generated by the input device are provided to a mapping function 170 for relation to determining gesture symbols. The gesture symbols determined from the mapping function 170 are provided to a writing module at 180 which may then output the gesture symbols in a predetermined manner. The command center 190 provides control via a gaming center, processing center, or other main base component of a gaming system in which controls and system level functions and directives may be set. The command center may be a gaming console which provides system level directives to accommodate gesture recognition via a remote input device at 160, mapping directives at 170 and writing instructions at 180.

Figure 2A:
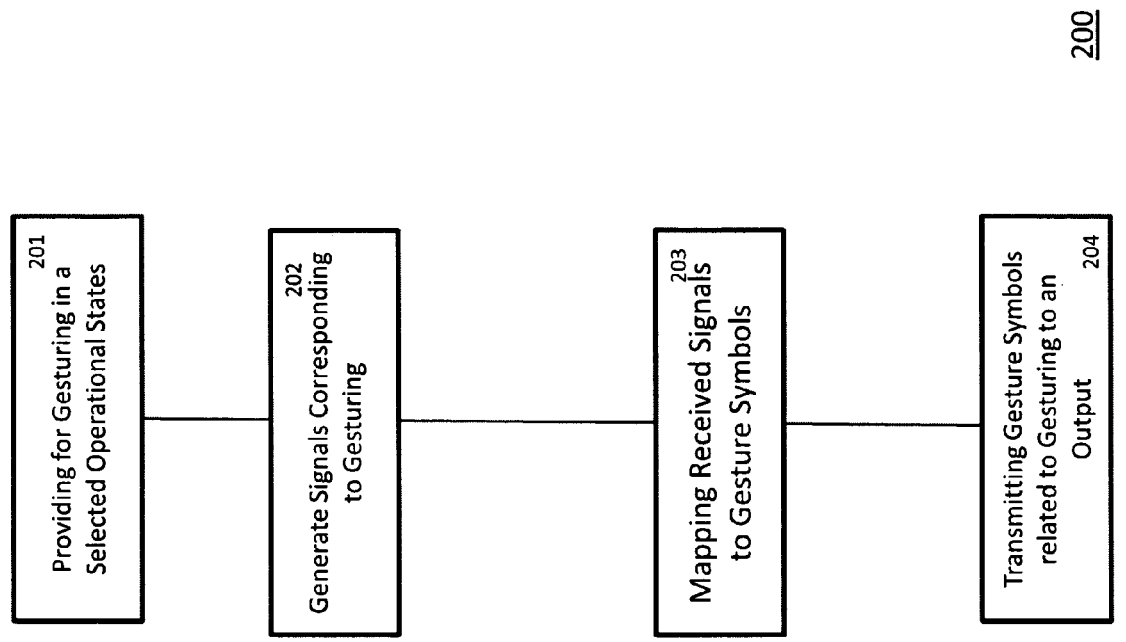
FIG. 2A is a flow chart for providing a method for generating one or more gesture signals for simulating writing in response to one or more physical movements of an electronic device used in a gaming system, in accordance with the present invention;.

FIG. 2A is a flow chart 200 for providing a method for generating one or more gesture signals for simulating writing in response to one or more physical movements of an electronic device used in a gaming system, in accordance with the present invention.

From FIG. 2A, an input device is provided at 201 which is capable of generating one or more gesture signals in one or more operational states in response to one or more gestures. The gesture, as used herein include movements and/or motions which may traverse three dimensions when using the input device, such that the movement of the input device by a user may form the shape of alphanumerics as well as other predetermined symbols or shapes (e.g., Greek characters, check marks, smileys, etc.). Similarly, the gesture symbols are symbolic representations of the gesture shapes. The present invention is not limited to any particular embodiment of shapes, characters, or symbols, as gesture symbols are intended to further include and not be limited to keystrokes shapes, letters, symbols, indicia, and/or combinations thereof.

Gesture signals of the input device 201 are generated in response to movements of the input device at 202 for the selected mode, preferably in a non-gaming or mixed mode, where a gesture signal is generated for each gesture in relation to a movement. In a further implementation, in a communication or non-gaming mode, a single letter, such as "H", may be comprised of three gesture signals which when combined within a prescribed time are interpreted by the present invention to be an "H" and not three separate characters. The gesture signals may be signals generated by hardware, software, firmware or a combination thereof.

Once the gesture signals are generated at 202, the signals are provided to a mapping agent which maps the gesture signals to gesture symbols. Whereas the gesture signals comprise information related to the movement of the input device as generated, the gesture symbols represent a symbol interpretation which is to be displayed in relation to the gesture signal as determined from a comparative mapping step. The mapping of gesture symbols with gesture signals may be performed by hardware, software, firmware or a combination thereof.

For instance, the gesture signals resulting from the movement of an input device by a user in which the user makes the general movement of a linear downward motion followed by a leftward sweeping concave arc upward is understood by the present invention to form the letter "J". Similarly an initial rightward sweeping concave arc followed by an upward linear movement is also understood by the present invention to form the letter "J." The gesture signal in both situations will contain data information which includes the movement characteristics of the motion of the input device as performed by the user. The gesture signal is then mapped to gesture symbols, where, preferably, the gesture symbols are pre-populated in a database networked with the gaming system such that a comparative mapping step may be timely performed. In the above examples, the gesture signal having the data indicating the "J" shape, is compared with suggested, historical, and/or predetermined data information resident in the gesture symbol database for comparison with the gesture signal. Preferably, a software interpretative script is utilized to assist in this comparative step, though the present invention is not so limited.

Once the mapping is completed at 203, a gesture symbol is determined for a gesture signal, and the gesture symbol is provided to an output at 204. In various implementations, the output may be a display or a printer whereas in one or more preferred implementations, the mapped gesture symbol is transmitted to an output device for action by the output device such as displaying on the gaming system's display as may be determined by the selected mode.

Additionally a gesture signal may be further defined by various writing character throughput and spatial movement aspects, for instance, as further set forth below, which are initiated after an alternate mode or state (i.e., non-gaming operational state) is entered.

A. Character Throughput

1. Serial Processing of Characters

The user would input one character at a time and that character would appear in a text box in a serial manner. Other operating systems such as Palm are known to have a method of physically writing letters onto the touch-screen of handhelds, which and thereafter interpreting the written diagram and inserting the interpretation as text into an application. Although such systems generally accommodate only one letter at a time as it translated the motion detected on the touch screen to create the appropriate character, such approaches are usable by the present invention.

2. Group Processing of Strings

It is envisioned by the present invention that the user could write a string of characters across the screen such that once the screen was as filled as the user desired, the body of characters on the screen is translated by the present invention and inserted in a text box. Then, the present invention may also remove hand-written data from the screen. Further, it is known that the Microsoft hand-writing interpretation program can take a message written onto a touch screen, like a Tablet PC, for example, and insert the text into an application. So as to permit a string of characters to be written on the screen before the characters are inserted into the text window. Accordingly, such an approach is usable by the present invention.

B. Spatial Movement

1. Two-Dimensional Plane

It is envisioned by the present invention that the user could choose to simulate a 2-D plane (horizontal or vertical), where movement could be interpreted for writing. In one implementation, the writing would be done in the traditional sense, up-and-down and side-to-side like writing on a sheet, and the space in front of the user could be the virtual paper, while direct pointing at the screen controls the motion for writing. For example: using an input device of the present invention, a user may trace the character "S". In another implementation, the writing maybe performed via the selection of characters given movement. For examples, it is known that the Wii implementation of text entry revolves around a set of characters arranged like the traditional keyboard on the display. The motion sensing controller is used to select characters one at a time. The present invention would further accommodate an overlay of a semi-transparent set of characters over the game which is being played, and select characters with the controller in one hand, while continuing game play with the controller in the other hand. By overlaying a layer of text input and/or chat over the game play, text input from a controller is enabled while not entering completely into text-entry mode. This allows the user to enter text while continuing game play via a multi-input mechanism, which is an unobtrusive advantage of the present invention.

By way of further example, where a screen displays characters arranged in some manner across the screen, the user using the present invention is able to select a character or sets of characters through movements such as drawing shapes around letters, placing hand over letters for a period of time, dragging of a character across a screen, etc. In a further example, where a traditional keyboard is segmented into virtual areas in front of the user, the user using the present invention is able to simulate writing through text input.

2. Three-Dimensional Space

It is envisioned by the present invention that motion through 3-D space in conjunction with multiple devices can present powerful writing applications and that the present invention is so capable such that, if the present invention were used with game consoles equipped with multiple motion-sensing devices, then the following could be further provided: a. Writing via the interpretation of motion for sign language (Example: Cyber gloves); b. Sophisticated coordination of movement to draw multiple segments of a character. (Example 1: One hand moves vertically while the other moves horizontally to compose the letter "T"; Example 2: Two fingers on left hand drag horizontally while one finger on the right hand drags vertically to compose the letter "I"); and c. One hand maintains movement via position pressure, or acceleration while the other traces or draws characters.

Figure 2B:
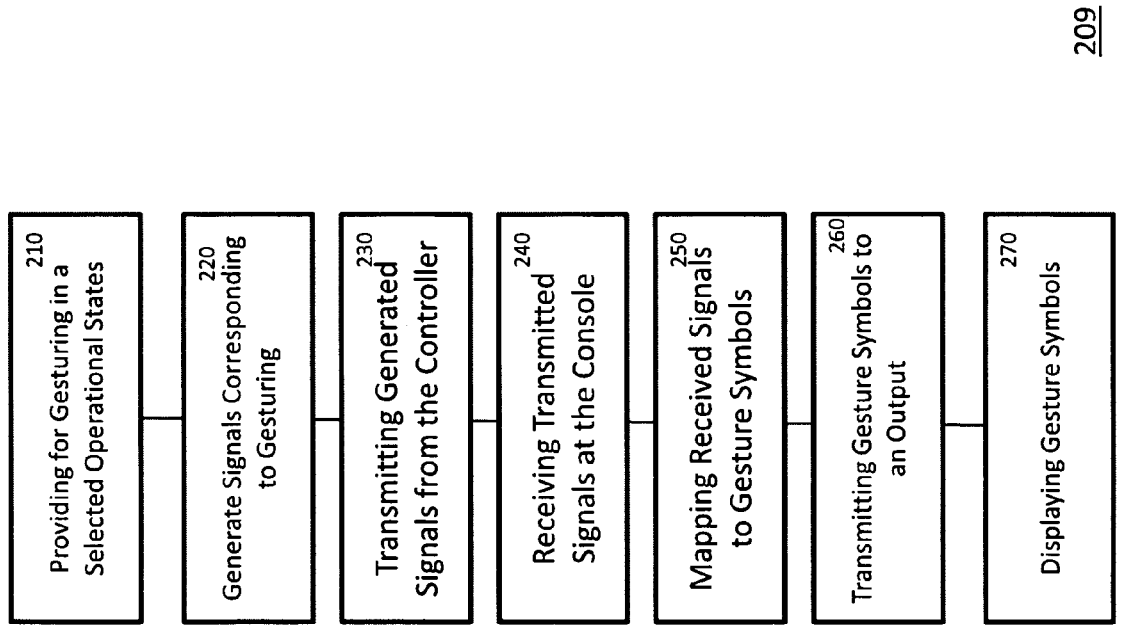
FIG. 2B is a flow chart for providing a method for generating one or more gesture signals for simulating writing in response to one or more physical movements of an electronic device used in a gaming system in which a controller detects the movements and a display displays the one or more gesture symbols associated with its respective gesture signals, in accordance with one implementation of the present invention; and, FIG. 3 is a depiction of certain implementations of possible approaches for a user to enter an operational state or mode of the present invention.

FIG. 2B is a flow chart 209 for providing a method for generating one or more gesture signals for simulating writing in response to one or more physical movements of an electronic device used in a gaming system in which a controller detects the movements and a display displays the one or more gesture symbols associated with its respective gesture signals, in accordance with one implementation of the present invention.

From FIG. 2B, an input device is provided at 210 which is capable of generating one or more gesture signals in response to one or more gestures, in relation to a selected one or more operational states (i.e., modes). Preferably, the operational state is selected using the input device in which a mode of gaming or a mode of non-gaming is chosen by a user with the input device. In the mode of gaming, the present invention uses a controller (i.e., input device) of the gaming system to provide signals with regard to the gaming experience and activity. In the mode of non-gaming, the present invention uses a controller of the gaming system to create gestures which may then be interpreted by the present invention to be gesture symbols for display on the gaming system in the non-gaming mode.

Gesture signals of the input device 210 are generated in response to movements of the input device at 220 for the selected mode. A gesture signal is generated for each gesture in relation to a respective movement. Once the gesture signals are generated at 220, the signals are transmitted from the input device to the console or base of the gaming system. Alternatively, the signals may be transmitted to a server or other main processing location associated with the input device.

The transmitted signals of 230 are then received by the base at 240 in which the base then may perform a mapping of the received gesture signals with predetermined gesture symbols at 250. The mapping may be performed by the processor, program product resident on a storage device, text interpreting script, look-up tables, comparative script, or other processing means to conduct the comparative mapping step. The predetermined gesture symbols contain information associated with movement and related information contained in gesture signals transmitted from the input device such that associations may be readily drawn in the comparative mapping step as between movements of the input device for an intended symbol and the information as to the likely symbol populated in the symbol database, however, the present invention is not so limited. The mapping of gesture symbols with gesture signals may be performed by hardware, software, firmware or a combination thereof.

In a further preferred implementation, the mapping may be performed by identifying one or more gesture symbols for each respective gesture signal via comparing one or more of position, movement and motion information from a gesture signal with a pre-populated database of gesture symbols and determining the one or more gesture symbols corresponding to the respective gesture signal. Preferably, such a comparative aspect is performed using software and a pre-populated database having gesture symbols therein.

Once the mapping is completed at 250, a gesture symbol is determined in relation to its respective gesture signal, and the gesture symbol is transmitted to an identified output device, preferably in relation to the selected mode at 260. In a preferred implementation, the user prefers that the gesture made appear as a symbol on the display on the gaming system when in the selected mode, such that the transmitted symbol at 260 is provided to a display for displaying at 270. Similarly, one or more gesture symbols may be displayed in relation to the selected mode and may be further defined by various writing character throughput and spatial movement aspects, for instance, as previously discussed, which are initiated after an alternate mode or state (i.e., non-gaming operational state) is entered.

Figure 3:
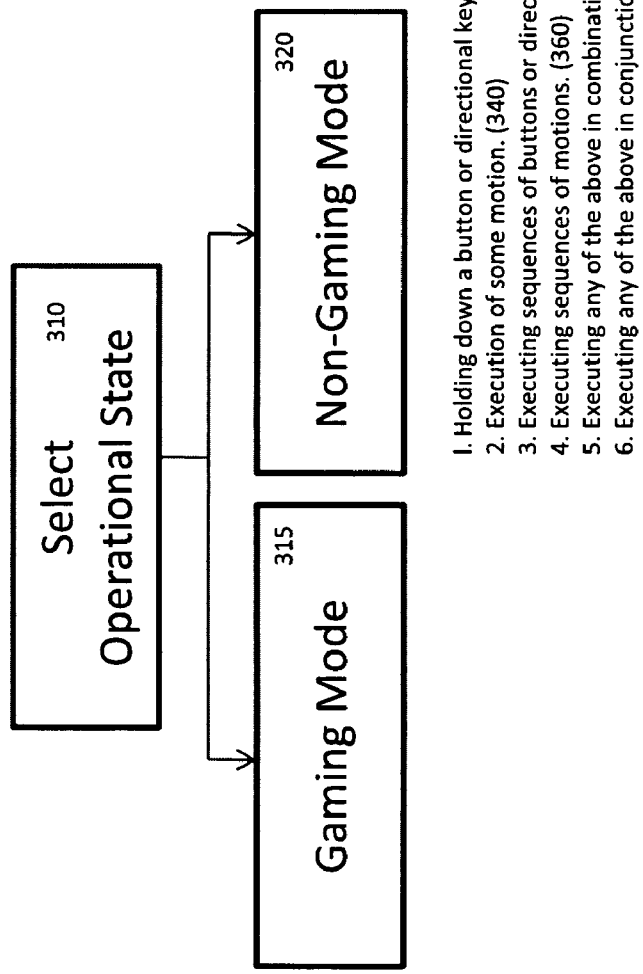

FIG. 3 is a depiction of certain implementations of possible approaches for a user to enter an operational state or mode of the present invention, however, FIG. 3 is not intended to be an exhaustive or inclusive listing as the present invention is not so limited.

From FIG. 3, in a preferred implementation, the operational state is selected at 310 by using the input device and may be one of gaming 315 or non-gaming 320. It will be understood by those skilled in the art that references herein as to other naming conventions and examples of states or modes which are not gaming are intended to be interchangeable with non-gaming, for instance. The operational mode selected by a user for the present invention is non-gaming 320. In a preferred implementation, the user may select a mode by depressing a button on the input device (as in 330) or by shaking the input device in a predetermined pattern for a predetermined period of time (as in 360). The non-gaming mode, in various implementations, may be performed in-game or outside of game play such that a separate display, sub-display, segmented display or other method may be made visible to alert the user that a non-gaming state has been selected. In further implementations the selection of a non-gaming state may not preclude the user from switching back and forth to maintain the gaming experience presently underway. Having selected the non-gaming mode at 320, the user enters a mode which enables the present invention to distinguish motion used by the input device to simulate writing instead of motion used in regular gameplay. This can be a distinct burst in time or for a prolonged period dependent upon the way the user chooses to input characters. From FIG. 3, various approaches to enter the non-gaming mode may include but are not limited to:

1. Holding down a button or directional keypad/stick. (330)
2. Execution of some motion. (340)
3. Executing sequences of buttons or directional keypad/stick. (350)
4. Executing sequences of motions. (360)
5. Executing any of the above in combination. (370)
6. Executing any of the above in conjunction with a timing mechanism. (380)

It will be understood and appreciated by those in the art that the present invention may employ alternative approaches and methods for selecting operational states such as but not limited to designating buttons, movements, or time lapses set up by the user or the gaming application program interface (API). This alternate mode or state is used to represent the commencement, suspension, or cessation of writing.

Preferred Implementations of the Present Invention

The following present preferred implementations of the present invention are presented for exemplary purposes only. These scenarios further reflect that the present invention provides flexibility in operation that allows multi-input technology to be utilized from more than one source.

Scenario 1. A player is text messaging with friends while playing a bowling game. Since bowling controls typically only require one hand, the player, using the present invention is able to write text with one hand, while continuing game play with the other hand. A switchable single or dual operating mode is enabled with the present invention.

Scenario 2: A player is playing a game which utilizes text input as a method of playing the game. For instance if there was a trivia portion embedded in the game, the trivia portion might require text entry from the player. The present invention enables the player to use the controller for text entry in various operating modes.

Scenario 3: In Second Life, or other similar virtual world application, a player using the present invention may use one controller to direct their avatar around the virtual space, while using another controller to select windows, enter text, etc., in various operating modes. It will be further appreciated by those skilled in the art that the present invention also provides the capability for multiple signals or controllers (i.e., multiple input via both hands, etc.) to be utilized to further develop additional levels of sophistication in the translation.

A method and system for generating one or more symbols in response to one or more gestures using an input device of a gaming system has been provided. The method and system include providing the input device being capable of generating one or more gesture signals in response to one or more gestures and being operable to select a mode of one or more operational states; providing for generating one or more gesture signals corresponding to the gesturing; mapping the one or more generated gesture signals in relation to one or more symbols, respectively; and, providing for transmitting one or more symbols corresponding to the respective gesture signals associated with the gesturing to an output.

As used herein, the generic terms "remote" and "controller" are intended to be used interchangeably with the term "input device."

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for generating one or more gesture symbols in response to one or more physical movements of an electronic input device used in a gaming system, the device being capable of generating one or more gesture signals in one or more operational states being one of a gaming environment, a non-gaming environment and a mixed environment, comprising: while in a first operational state of the gaming system, initiating a second operational state using a first gaming controller input device of the gaming system, wherein the second operational state includes a semi-transparent set of characters overlayed onto a view of the first operational state, wherein the first operational state is not suspended during the second operational state, and wherein the first gaming controller input device is able to detect motion displacement, detect movement, or a combination thereof, wherein the first operational state is a gaming state and wherein the second operational state is a non-gaming state; gesturing one or more writing symbols using a second gaming controller input device of the gaming system, wherein the second gaming controller input device is able to detect motion displacement, detect movement, or a combination thereof; generating one or more gesture signals in response to the gestured one or more writing symbols in relation to respective physical movements of the device corresponding for each gestured writing symbol to one or more of: detected motion displacement and detected movement of the device;

transmitting the one or more gesture signals to a receiver of the gaming system; mapping the one or more received gesture signals with a gesture symbol database to determine a gesture symbol for each of the one or more gesture signals; transmitting the one or more determined gesture symbols to facilitate communication associated with the first operational state;

generating the one or more gesture symbols as an output corresponding to the first operational state; and suspending the second operational state.

2. The method of claim 1, wherein the input device is at least one of a device having a mechanism for determining movement and motion; wherein the input device is a gaming controller, a gaming remote, a gaming peripheral or a controlling device, any of which are operable with the gaming system; and is able to detect one or more of motion displacement, movement, or a combination thereof.

3. The method of claim 1, wherein the first operational state is a gaming state, and wherein the second operational state is one of a non-gaming state and a mixed state.

4. The method of claim 3, wherein the mixed state includes an in-game or outside of game play portion such that a separate display, sub-display, segmented display or other display area is visible concurrent with a game display area.

5. The method of claim 3, wherein the first operational state is selected followed by the second operational state is selected, whereby a mode of a selected operational state is not dependent necessarily on a characteristic of time, and that an operational state may have both a gaming and a non-gaming aspects to such state.

6. The method of claim 1, wherein the gestures and symbols may portray one or more of movements and motions which may traverse three dimensions when using the input device, and may further form a shape of alphanumerics, foreign language characters, symbols shapes, smileys, keystrokes shapes, letters, indicia and other predetermined characters intended to further include and not be limited to, and combinations thereof.

7. The method of claim 1, wherein the mapping further comprises identifying one or more gesture symbols for each respective gesture signal by comparing one or more of position, movement and motion information from a gesture signal with a pre-populated database of gesture symbols and determining the one or more gesture symbols corresponding to the respective gesture signal.

8. The method of claim 1, further comprising displaying the one or more symbols on a display of the gaming system in relation to the selected mode.

9. The method of claim 8, wherein the displayed one or more symbols are displayed in relation to the selected mode and are further defined by writing character throughput and spatial movement aspects.

10. A computer program product for mapping one or more gesture signals to one or more gesture symbols for association with physical movements of an input device and its respective output of one or more gesture symbols, for a gaming system including a computer, a storage medium, and a processor, the input device being capable of generating one or more gesture signals in response to one or more gestures, capable of transmitting one or more gesture signals, and being operable to select a mode of one or more operational states, and a console being capable of receiving one or more transmitted gesture signals and generating one or more symbols; the computer program product comprising a non-transitory computer readable medium having program instructions for: while in a first operational state of the gaming system, initiating a second operational state using a first gaming controller input device of the gaming system, wherein the second operational state includes a semi-transparent set of characters overlayed onto a view of the first operational state, wherein the first operational state is not suspended during the second operational state, and wherein the first gaming controller input device is able to detect motion displacement, detect movement, or a combination thereof, wherein the first operational state is a gaming state and wherein the second operational state is a non-gaming state; generating one or more gesture signals in response to one or more writing symbols gestured by a second gaming controller input device of the gaming system in relation to respective physical movements of the second gaming controller input device determined by detecting one or more of motion displacement and movement of the second gaming controller input device during gesturing, wherein the second gaming controller input device is able to detect motion displacement, detect movement, or a combination thereof; transmitting the one or more gesture signals from the second gaming controller input device to a receiver of the gaming system; mapping the one or more received gesture signals with a pre-populated gesture symbol database to determine a gesture symbol for each of the one or more gesture signals; transmitting the one or more determined gesture symbols to facilitate communication associated with the first operational state; and suspending the second operational state.

11. The computer program product of claim 10, wherein the input device is at least one of a device having a mechanism for determining movement and motion;
wherein the input device is a gaming controller, a gaming remote, a gaming peripheral or a controlling device, any of which are operable with the gaming system; and is able to detect one or more of displacement, movement, or a combination thereof.

12. The computer program product of claim 10, wherein the first operational state is a gaming state, and wherein the second operational state is one of a non-gaming state and a mixed state.

13. The computer program product of claim 12, wherein the mixed state includes an in-game or outside of game play portion such that a separate display, sub-display, segmented display or other display area is visible concurrent with a game display area.

14. The computer program product of claim 12, wherein the first operational state is selected followed by the second operational state is selected, whereby a mode of a selected operational state is not dependent necessarily on a characteristic of time, and that an operational state may have both a gaming and a non-gaming aspects to such state.

15. The computer program product of claim 10, wherein the gestures and symbols may portray one or more of movements and motions which may traverse three dimensions when using the input device, and may further form a shape of alphanumerics, foreign language characters, symbols shapes, smileys, keystrokes shapes, letters, indicia and other predetermined characters intended to further include and not be limited to, and combinations thereof.

16. The computer program product of claim 10, wherein the mapping further comprises identifying one or more gesture symbols for each respective gesture signal by comparing one or more of position, movement and motion information from a gesture signal with a pre-populated database of gesture symbols and determining the one or more gesture symbols corresponding to the respective gesture signal.

17. The computer program product of claim 10, further comprising displaying the one or more symbols on a display of the gaming system in relation to the selected mode.

18. The computer program product of claim 17, wherein the displayed one or more symbols are displayed in relation to the selected mode and are further defined by writing character throughput and spatial movement aspects.

19. The computer program product of claim 10, further comprising the step of displaying the symbols.

* * * * *